United States Patent [19]
Smith

[11] Patent Number: 5,499,181
[45] Date of Patent: Mar. 12, 1996

[54] METHODS AND APPARATUS FOR INPUTTING INFORMATION TO A VEHICLE

[75] Inventor: Harry F. Smith, Newtown, Conn.

[73] Assignee: Intellectual Property Development Associates of Connecticut, Inc., Trumbull, Conn.

[21] Appl. No.: 317,928

[22] Filed: Oct. 4, 1994

Related U.S. Application Data

[63] Continuation-in-part of Ser. No. 253,983, Jun. 3, 1994, which is a continuation of Ser. No. 66,967, May 25, 1993, Pat. No. 5,327,066.

[51] Int. Cl.$^6$ .................................................. G06F 15/00
[52] U.S. Cl. ................................ 364/424.04; 340/457.4
[58] Field of Search .................... 364/424.01, 424.03, 364/424.04, 551.01; 340/457, 457.4

[56] References Cited

U.S. PATENT DOCUMENTS

| | | | |
|---|---|---|---|
| 4,159,531 | 6/1979 | McGrath | 364/900 |
| 4,309,644 | 1/1982 | Reimers et al. | 318/139 |
| 4,347,472 | 8/1982 | Lemelson | 320/2 |
| 4,383,210 | 5/1983 | Wilkinson | 320/2 |
| 4,404,641 | 9/1983 | Bazarnik | 364/569 |
| 4,532,418 | 7/1985 | Meese et al. | 235/381 |
| 4,532,511 | 7/1985 | Lemelson | 340/933 |
| 4,658,371 | 4/1987 | Walsh et al. | 364/550 |
| 4,800,328 | 1/1989 | Bolger et al. | 320/2 |
| 4,861,971 | 8/1989 | Chan | 235/384 |
| 4,876,540 | 10/1989 | Berthon et al. | 340/932.2 |
| 4,880,097 | 11/1989 | Speas | 194/239 |
| 4,884,054 | 11/1989 | Moon, Sr. | 340/309.15 |
| 4,910,672 | 3/1990 | Off et al. | 364/405 |
| 4,967,895 | 11/1990 | Speas | 194/200 |
| 5,003,476 | 3/1991 | Abe | 364/424.03 |
| 5,003,520 | 3/1991 | Grieu et al. | 368/90 |
| 5,049,802 | 9/1991 | Mintus et al. | 320/2 |
| 5,058,044 | 10/1991 | Stewart et al. | 364/551.01 |
| 5,063,610 | 11/1991 | Alwadish et al. | 455/45 |
| 5,069,453 | 12/1991 | Koza et al. | 273/139 |
| 5,072,380 | 12/1991 | Randelman et al. | 364/406 |
| 5,157,319 | 10/1992 | Klontz et al. | 320/2 |
| 5,176,224 | 1/1993 | Spector | 186/52 |
| 5,202,617 | 4/1993 | Nor | 320/2 |
| 5,204,819 | 4/1993 | Ryan | 364/465 |
| 5,263,565 | 11/1993 | Wilkinson | 194/216 |
| 5,278,759 | 1/1994 | Berra et al. | 364/424.01 |
| 5,345,384 | 9/1994 | Przybyla et al. | 364/424.04 |
| 5,400,018 | 3/1995 | Scholl et al. | 340/825.54 |
| 5,442,553 | 8/1995 | Parrillo | 364/424.04 |

Primary Examiner—Michael Zanelli

[57] ABSTRACT

Disclosed are methods and apparatus for communicating with an occupant of a vehicle. A method includes the steps of coupling the vehicle to a station; transferring information from the station into the vehicle; and receiving the transferred information and storing the transferred information within the vehicle. In this embodiment of the invention the station is located at a site that provides a service for the vehicle, and the transferred information includes a portion that indicates when a next service is due for the vehicle. The transferred information may include a date that a next service is due and/or a distance that the vehicle is to travel before the next service is due. In this embodiment the vehicle automatically compares a current date and/or an odometer reading to the stored information; and presents a message within the vehicle in human perceptible form when equality is indicated. The information transferred into the vehicle may also include at least executable program instruction and an associated memory address for storage of the at least one instruction.

26 Claims, 8 Drawing Sheets

METHODS AND APPARATUS FOR INPUTTING INFORMATION TO A VEHICLE

CROSS-REFERENCE TO RELATED PATENT APPLICATIONS

This patent application is a continuation-in-part of and commonly assigned U.S. patent application Ser. No. 08/253,983, filed Jun. 3, 1994 by Harry F. Smith, which is a continuation of commonly assigned U.S. patent application Ser. No. 08/066,967, filed May 23, 1993, now U.S. Pat. No. 5,327,066, issued Jul. 5, 1994.

FIELD OF THE INVENTION

This invention relates generally to methods and apparatus for inputting information to a vehicle.

BACKGROUND OF THE INVENTION

The inventor's U.S. Pat. No. 5,327,066 teaches methods and apparatus to enable an information flow between an occupant of a vehicle and an external source or recipient of information, whether the vehicle be battery powered or powered by an internal combustion engine. By example, information representing an account number is transferred from a memory within the vehicle during a recharging or refueling operation and, via a recharging or refueling station, may be transferred to another location for verification purposes. In addition, one or more solicited or unsolicited messages may be transferred between the vehicle and the station. A message transferred into the vehicle can be stored and subsequently presented in a human perceptible format, such as by a display device within the vehicle.

The following U.S. Patents disclose various types of battery charging systems: U.S. Pat. No. 5,202,617, issued on Apr. 13, 1993, entitled "Charging Station For Electric Vehicles" by Nor; U.S. Pat. No. 5,049,802, issued on Sep. 17, 1991, entitled "Charging System For A Vehicle" by Mintus et al.; U.S. Pat. No. 4,532,418, issued on Jul. 30, 1985, entitled "Microprocessor Electric Vehicle Charging and Parking Meter System Structure And Method" by Meese et al.; U.S. Pat. No. 4,383,210, issued on May 10, 1983, entitled "Apparatus And Method For Recharging An Energy Storage Device" by Wilkinson; U.S. Pat. No. 4,347,472, issued on Aug. 31, 1982, entitled "Apparatus And Method For Charging A Battery In A Vehicle" by Lemelson; and U.S. Pat. No. 4,309,644, issued on Jan. 5, 1982, entitled "Electric Vehicle Controller Adapted For Charge Station Connection" by Reimers et al.

The following two U.S. Patents disclose systems for charging a battery within a vehicle without physically contacting the vehicle: U.S. Pat. No. 5,157,319, issued on Oct. 20, 1992, entitled "Contactless Battery Charging System" by Klontz et al.; and U.S. Pat. No. 4,800,328, issued on Jan. 24, 1989, entitled "Inductive Power Coupling With Constant Voltage Output" by Bolger et al.

The following U.S. Patents disclose various systems for accounting for parking fees: U.S. Pat. No. 5,003,520, issued Mar. 26, 1991, entitled "Time Accounting System In Particular For Parking Subject To Charge" by Grieu et al.; U.S. Pat. No. 4,880,097, issued Nov. 14, 1989, entitled "Park Card System For Electronic Parking Meter" by Speas; U.S. Pat. No. 4,876,540, issued on Oct. 24, 1989, entitled "System For Controlling Metered Parking" by Berthon et al.; U.S. Pat. No. 4,861,971, issued on Aug. 29, 1989 entitled "Parking Meters Capable of Being Operated Without Monetary Coins" by Chan; and U.S. Pat. No. 4,967,895, issued on Nov. 6, 1990, entitled "Parameter Control System For Electronic Parking Meter" by Speas.

OBJECTS OF THE INVENTION

It is one object of this invention to provide improved methods and apparatus for entering a consumable energy source into a vehicle.

Another object of this invention is to provide methods and apparatus for entering information into a vehicle, such as during a recharging or refueling operation, so as to provide a vehicle data processor with at least one executable instruction.

SUMMARY OF THE INVENTION

The foregoing objects of the invention are realized by methods and apparatus for inputting at least one instruction to be executed by a programmable device that is installed within a vehicle. A method includes the steps of coupling the vehicle to a station that is external to the vehicle; and inputting from the station into a memory within the vehicle at least one predetermined instruction to be executed by a programmable device within the vehicle. The step of inputting includes a step of inputting a predetermined address that is associated with the at least one predetermined instruction. The programmable device includes a program counter, and the step of inputting inputs the address into a storage location. The method further includes the steps of executing a plurality of instructions with the programmable device, each of the plurality of instructions being associated with an address; detecting a condition wherein a next instruction is associated with said predetermined address; and executing the at least one predetermined instruction.

Further in accordance with this invention there are disclosed methods and apparatus for communicating with an occupant of a vehicle. A method includes the steps of coupling the vehicle to a station; transferring information from the station into the vehicle; and receiving the transferred information and storing the transferred information within the vehicle. In this embodiment of the invention the station is located at a site that provides a service for the vehicle, and the transferred information includes a portion that indicates when a next service is due for the vehicle. The transferred information may include a date that a next service is due and/or a distance that the vehicle is to travel before the next service is due.

In this embodiment the vehicle automatically compares a current date and/or an odometer reading to the stored information; and presents a message within the vehicle in human perceptible form when equality is indicated.

BRIEF DESCRIPTION OF THE DRAWING

The foregoing and other features of the invention are made more apparent in the ensuing Detailed Description of the Invention, when read in conjunction with the attached Drawing, wherein:

FIG. 2b is a block diagram illustrating in greater detail the battery charging station of FIG. 2a;

FIG. 4 is a flowchart illustrating the operation of the central controlling station of FIG. 1a;

DETAILED DESCRIPTION OF THE INVENTION

Figure 1A:
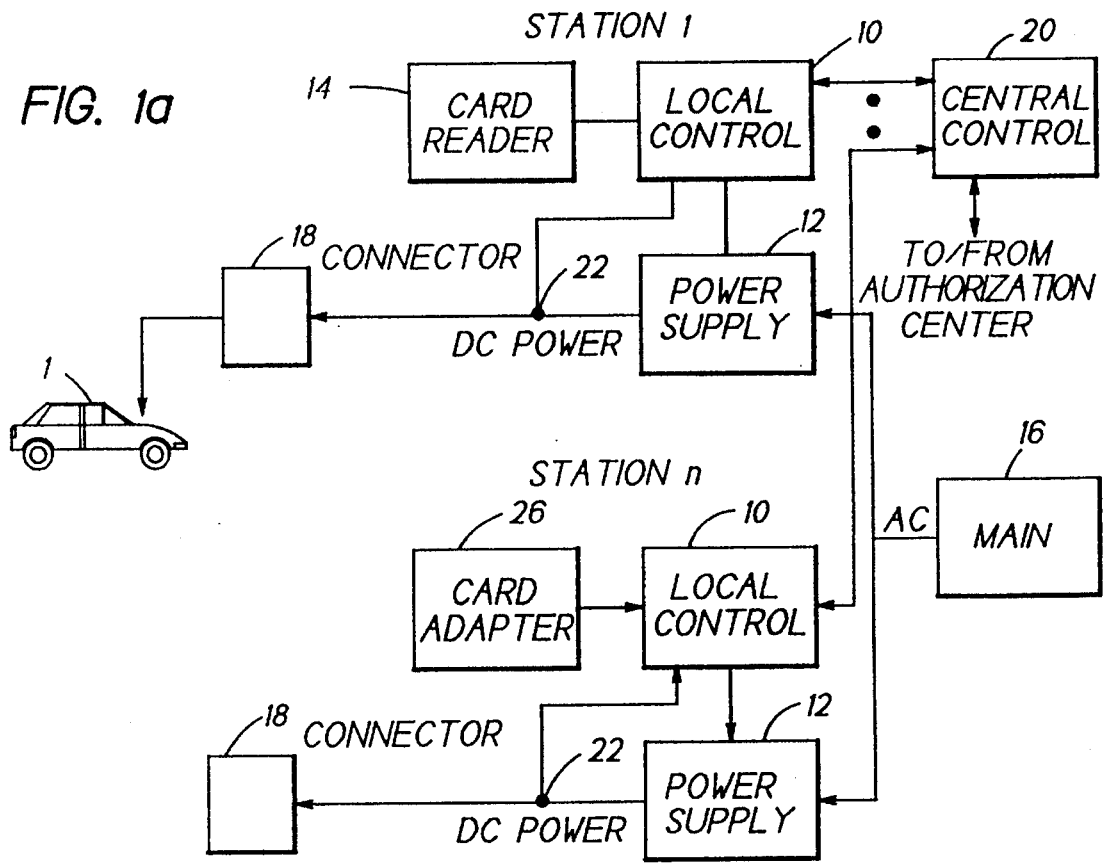
FIG. 1a is a block diagram illustrating the use of a plurality of battery charging stations, wherein indicia received from a consumer-provided card is transmitted to a central controlling station.

Referring to FIGS. 1a, 1b, 3 and 4 there is shown a plurality of battery charging stations, designated Station 1 to Station n, each of which includes a local controller 10, a power supply 12, and a card reader 14. Each power supply 12 receives an AC power input from a main 16. The power supply 12 includes a transformer 12a and a DC power supply 12b. The output of power supply 12 has a voltage potential suitable for recharging a battery within a vehicle 1. A suitable connector 18 is provided for coupling to the battery terminals of the vehicle 1.

The local controller 10 includes a microprocessor 10a, a timer 10b, and an analog-to-digital (A/D) converter 10c. Microprocessor 10a receives an input from the card reader 14, an input from the timer 10b, and an input from the A/D 10c. The microprocessor 10a provides an output to a switching device, such as a relay 12c, that is employed to open and close the transformer 12a circuit. During use, a consumer inserts a card 2 having indicia 3 on a surface thereof. The indicia may be recorded upon a magnetic stripe, a bar code, a series of punched-out openings, or any suitable medium for conveying the user's account number and possibly other information. The card reader 14 senses the indicia 3 and provides an output to the microprocessor 10a, the output being expressive of the information conveyed by the indicia 3. The microprocessor 10a is bidirectionally coupled to a central controller 20 for transmitting the indicia information thereto.

Figure 3:
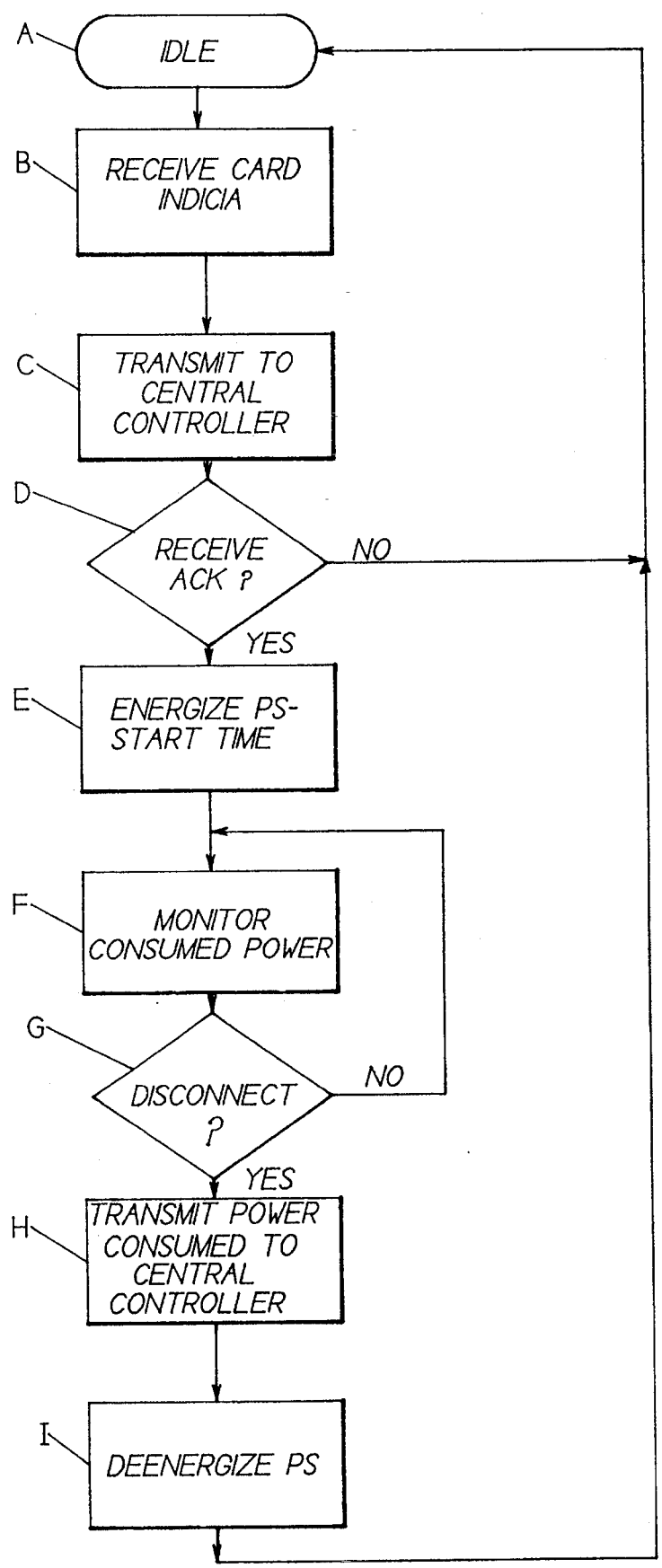
FIG. 3 is a flow chart illustrating the operation of one of the battery charging stations of FIGS. 1a and 1b.

Referring to FIG. 3, in response to the receipt of the digital signal from the card reader 14 the microprocessor 10a exits an IDLE state (A) and receives the digital signal (B). At block C the microprocessor transmits a digital signal to the central controller 20, the digital signal being expressive of information conveyed by the indicia 3.

Figure 4:
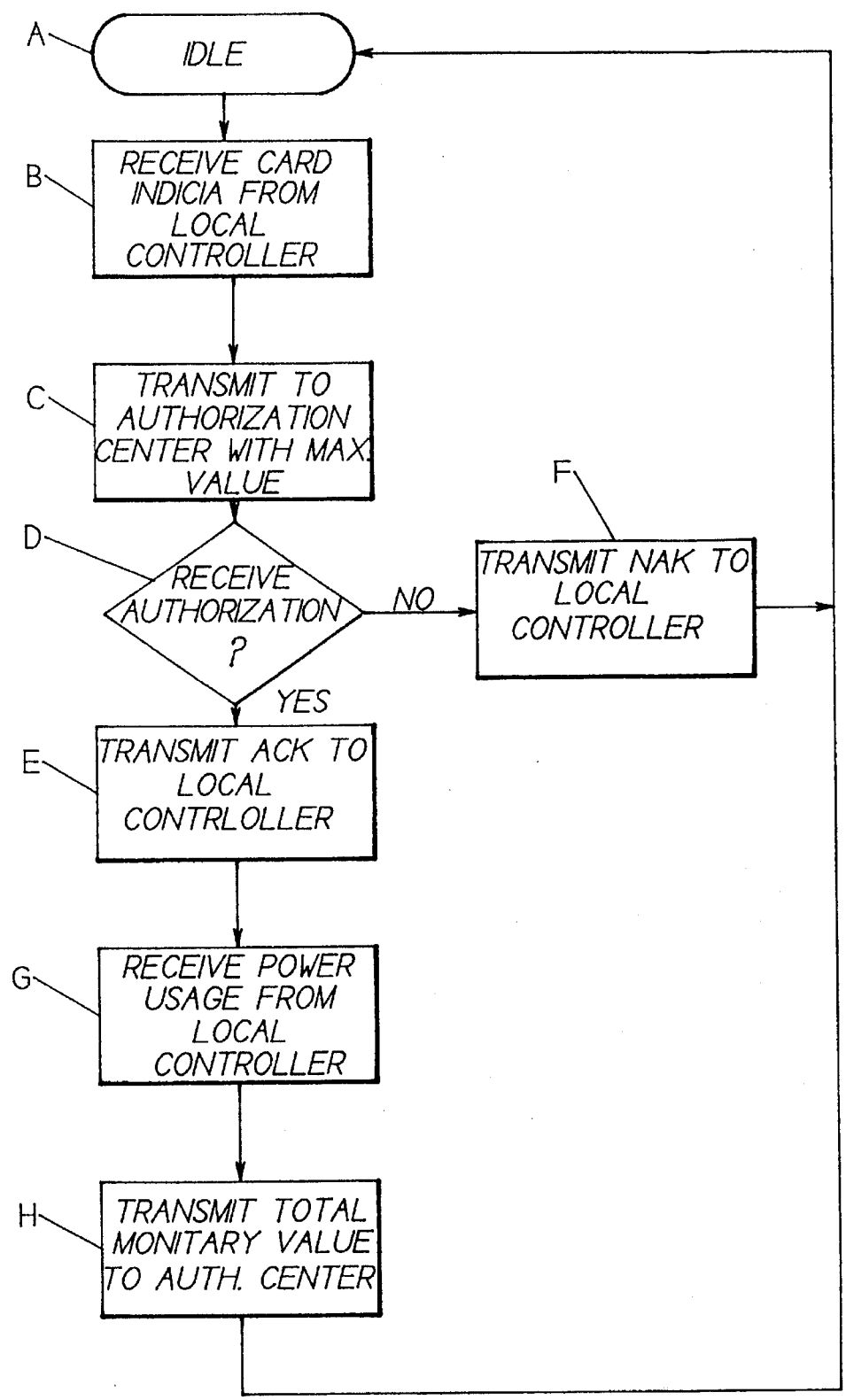

Referring to FIG. 4, in response to the transmission of the indicia information from the microprocessor 10a the central controller 20 exits an idle state (Block A) and receives the card indicia information from the microprocessor 10a (Block B). The central controller 20 transmits the indicia information to a remote authorization center. The central controller 20 may also transmit a maximum monetary value that the consumer will be expected to expend (Block C). The central controller 20 then waits to receive an authorization from the authorization center. If the authorization is received (Block D) the central controller 20 transmits an acknowledge (ACK) signal to the microprocessor 10a of the charging station (Block E). If the authorization is not received the central controller transmits a no acknowledge (NAK) signal to the local controller (Block F) and re-enters the idle state (A).

Returning to the flow chart of FIG. 3, the local controller 10 waits to receive the ACK (Block D) from the central controller 20. If the NAK signal is received instead the local controller 10 re-enters the idle state at Block A and no power is dispensed to the consumer. If the ACK signal is received the microprocessor 10a closes relay 12c so as to energize the DC power supply 12b (Block E). The microprocessor 10a also initiates timer 10b so as to record an amount of time that the power supply 12b is energized. The microprocessor 10a then monitors the power utilized by the consumer. To this end a suitable means is connected to the output of the power supply 12 so as to monitor the current flow from the DC power supply 12b. For example, an inductive pickup 22 may be provided adjacent the power leads, the output of the pickup 22 being indicative of the power flowing through the power leads. A low value resistance may also be inserted in series with a power lead and the voltage potential appearing across the resistance may be measured to obtain an indication of the charging current. It is also within the scope of the invention to instead meter the AC power at the input to the DC power supply 12b. The DC power supply 12b may be embodied within a linear power supply, a switching power supply, or any suitable AC/DC conversion apparatus. If a switching supply is used, the transformer 12a may be eliminated and the switching supply connected directly to the AC power input through a switch controlled by the microprocessor 10a.

For any of these various embodiments an analog signal indicative of the power consumed in recharging the vehicle's battery is converted, by the A/D 10c, to a digital reading that is input to the microprocessor 10a. It should be realized that AC power may be dispensed and metered, instead of DC power, if the vehicle is equipped with a suitable AC/DC converter.

In addition to monitoring the power usage of Block F, the microprocessor 10a operates at Block G to sense a disconnect condition wherein the vehicle battery is disconnected from the connector 18. This can be sensed, by example, by the current going to zero or the voltage rising to an open circuit value. So long as the disconnect is not sensed at Block G the microprocessor 10a continues to monitor the power usage at block F. When the disconnect is sensed at block G the microprocessor 10a transmits a signal to the controller 20, the signal indicating a total amount of power consumed (Block H). The microprocessor 10a then de-energizes the D/C power supply 12b by opening relay 12c (Block I) and reenters the idle state (Block A).

Referring again to FIG. 4, the central controller 20 receives, at Block G, the power usage signal from the microprocessor 10*a* of the local controller 10. Responsive thereto the central controller 20 transmits to the authorization or accounting center a signal indicative of a total monetary value that is to be charged to the consumer's account (Block H). Other charges may also be incurred in addition to the charge for the dispensed power. By example only, a usage fee or a parking fee may be added. The central controller 20 then reenters the idle state at Block A.

The timer 10*b* serves a dual function. The output of the timer 10*b* enables the microprocessor 10*a* to determine the total Watt-hours of electrical power that are consumed in charging the vehicle's battery. The timer 10*b* also indicates the amount of time that the vehicle 1 is connected to the charging station. For some applications it may be desirable to also bill the consumer for the amount of time that the vehicle 1 is connected. This may be especially advantageous when the vehicle 1 is connected for a significant period of time beyond what is required to fully charge the battery. For example, if the charging station is located in an airport parking lot the vehicle 1 may be connected for several days or even weeks to the charger, even though during a significant portion of this time only a trickle charge is being applied to the vehicle's battery. For this case, it may be advantageous to also bill the consumer for "connect time", that is to bill the consumer at an hourly or daily rate, regardless of the amount of power actually being consumed.

The card 2 presented by the consumer may be a conventional credit card. The card 2 may also be an Automatic Teller Machine (ATM) card, in which case the billed amount may be debited from a corresponding bank account maintained by the consumer. Also, the card 2 presented by the consumer may be a card especially issued to the consumer solely for the purpose of recharging the battery within the consumer's vehicle. That is, an electric utility may issue the card and the recorded charges may appear on the consumer's monthly statement. Alternatively, an organization that installs and maintains the charging stations may issue the card to the consumer, and subsequently bill the consumer for consumed power.

As employed herein an indicia representative of a monetary value is intended to encompass information recorded upon a substrate, such as a credit card; a bank account number recorded upon an ATM card; data stored within a memory device of a credit card or a memory device of the vehicle itself; an account number or an authorization number directly input by a consumer via a data entry device, such as a keypad or the like; and any other information that enables an account associated with a consumer to be charged or debited.

Figure 1B:
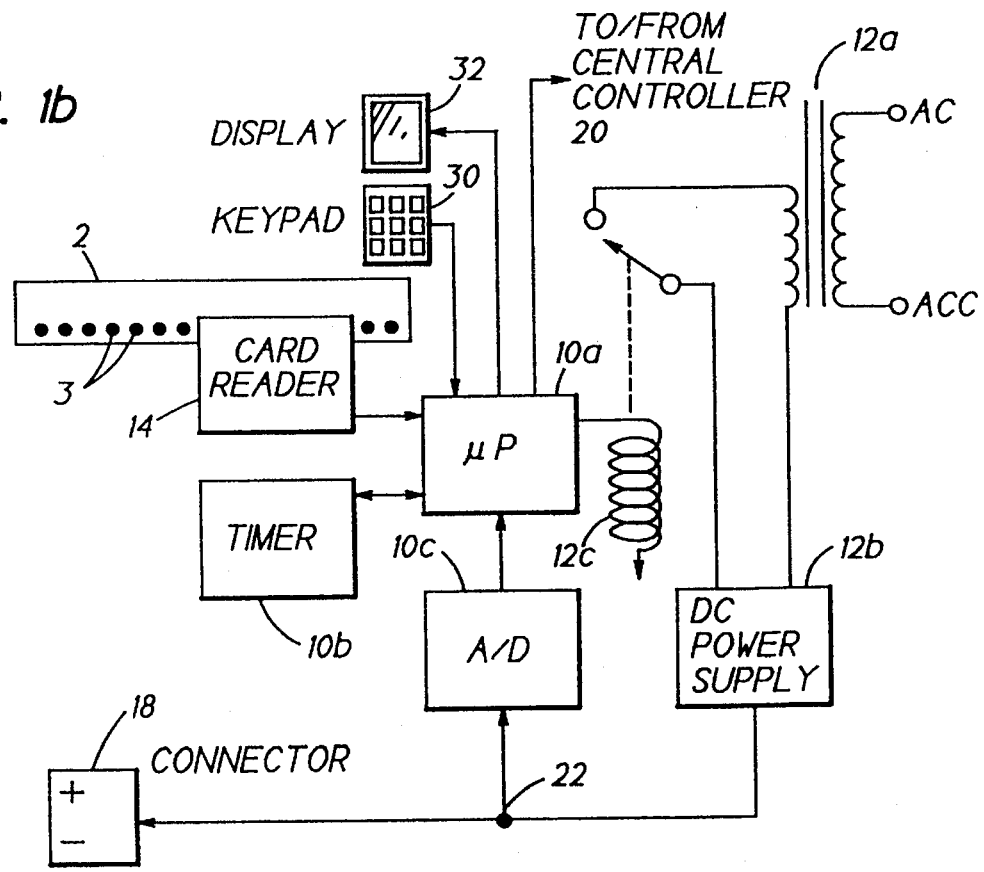
FIG. 1b is a block diagram illustrating in greater detail one of the charging stations of FIG. 1b.
Figure 2A:
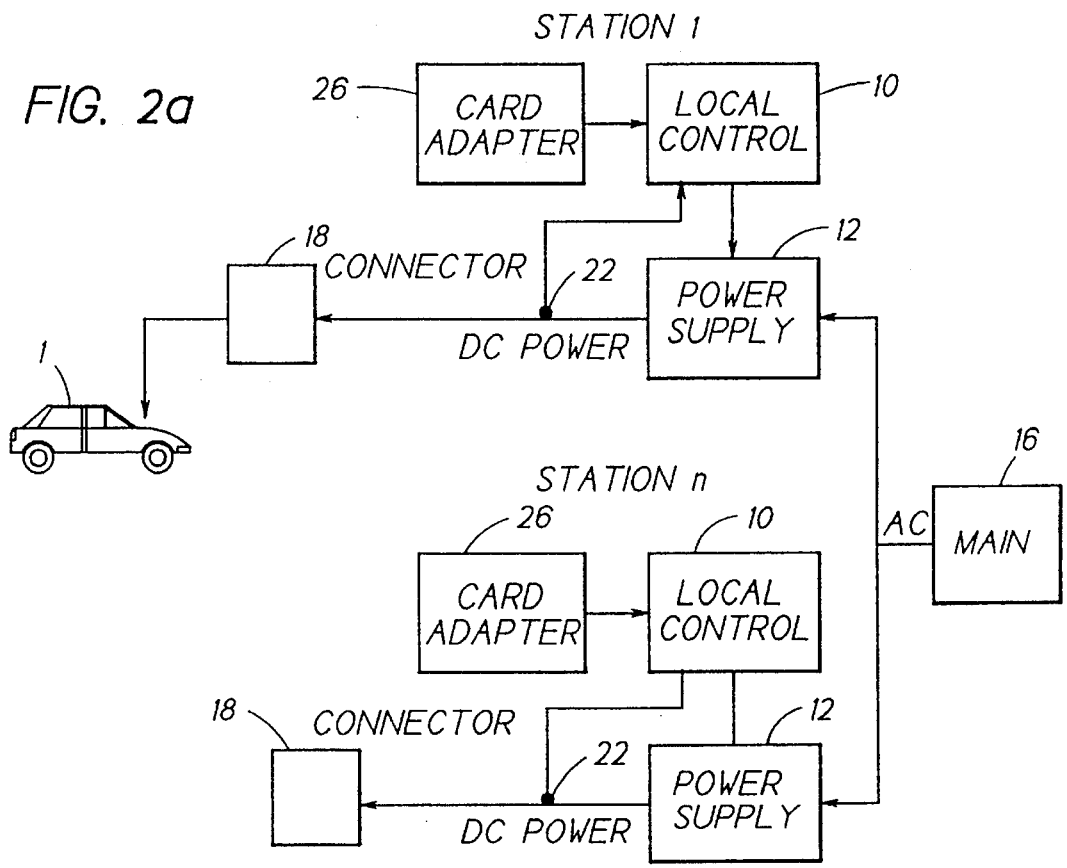
FIG. 2a is a block diagram showing an embodiment wherein a battery changing station debits a monetary balance stored within a consumer-provided card.
Figure 2B:
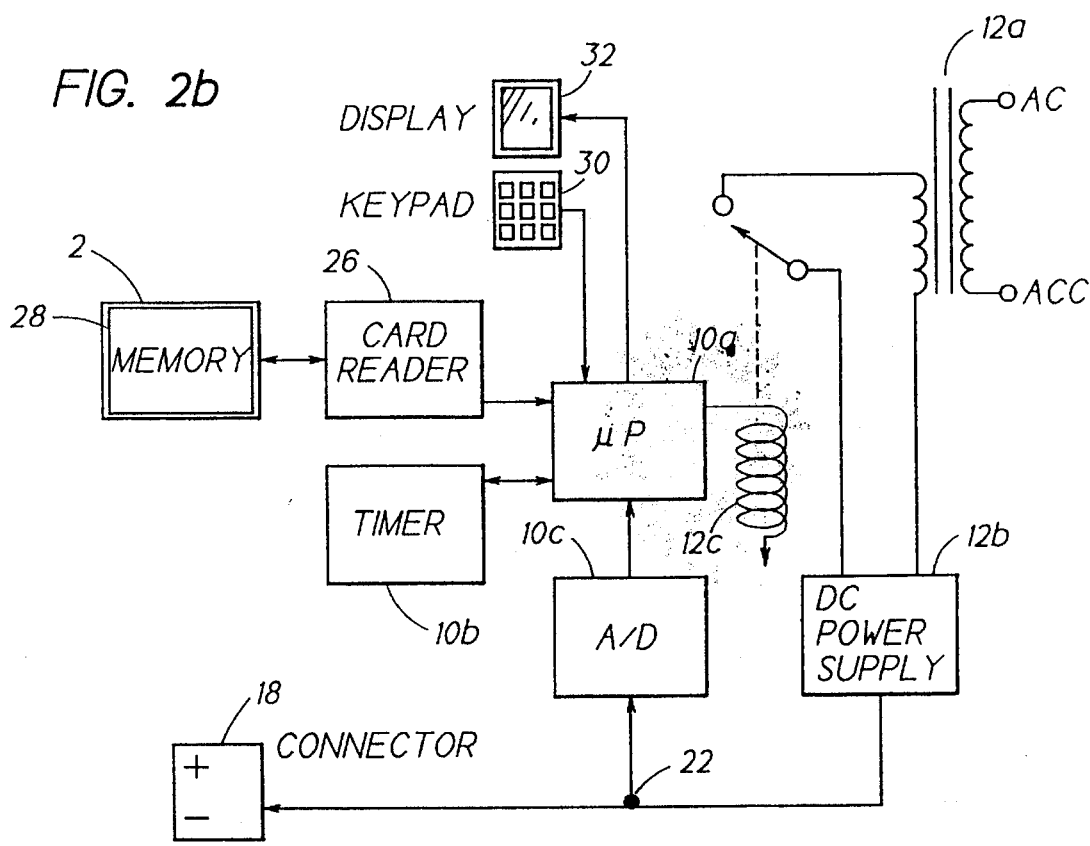

Referring now to FIGS. 2*a* and 2*b* there is illustrated a further embodiment, wherein components found also FIGS. 1*a* and 1*b* are numbered accordingly. In this embodiment each of the plurality of charging stations includes a card adapter 26. For this embodiment the local controller 10 is not required to be coupled to a central controller 20 or to an authorization center, in that the local controller 10 directly debits a monetary value stored within a memory 28 that is contained within the consumer's card 2. This embodiment is suited for use in, but not limited to, an application wherein a predetermined amount of power is provided to the consumer. That is, the local controller 10 initially debits the consumer's card by some predetermined monetary value, prior to dispensing power. When the microprocessor 10*a* determines that the billed amount of power has been consumed, the microprocessor 10*a* deactivates the DC power supply.

Figure 5:
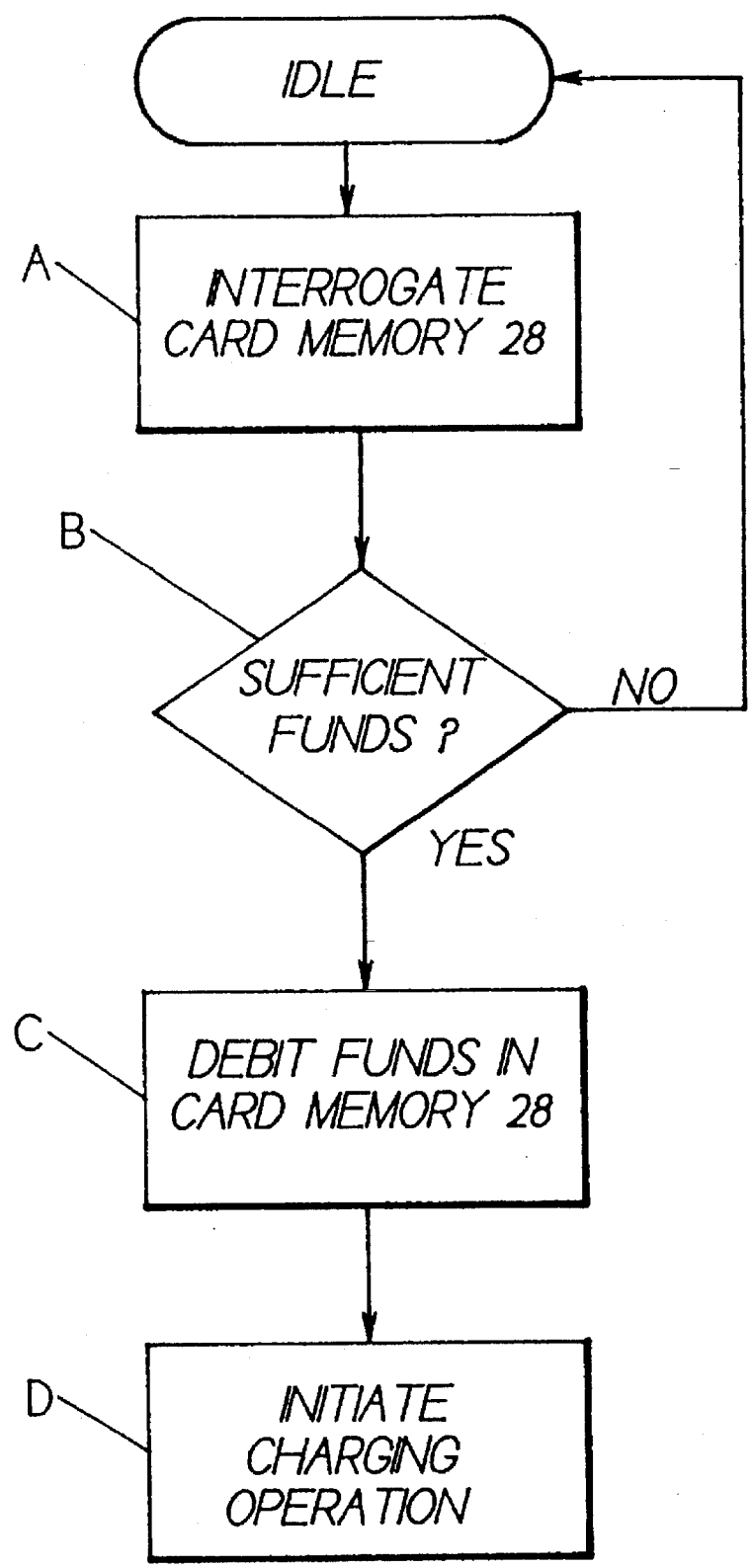
FIG. 5 is a flowchart illustrating the operation of the battery charging station of FIG. 2b.

In operation, and referring to FIG. 5, the microprocessor 10*a* interrogates the card memory 28 (Block A) to determine if the stored balance is at least equal to the amount to be debited (Block B). If this condition is satisfied, the microprocessor 10*a* debits the memory by the required monetary value (Block C) and initiates the charging operation (Block D). Pre-billing the consumer is desirable in that the consumer may purposely or inadvertently disconnect the charging station from the vehicle's battery, without also inserting the card into the card adapter 26.

It is within the scope of this teaching to consolidate the functionality of the plurality of local controllers 10, in particular the microprocessors 10*a*, into the central controller 20. For this embodiment each STATION includes a card interface device, such as the card reader 14 or card adapter 26, and also, preferably, the power supply 12. The central controller 20 is responsible for receiving input from the various card interfaces and for remotely activating the associated DC power supplies 12 to dispense power. For installations spread over a considerable distance the DC power supply 12 is preferably provided within each local STATION so as to reduce voltage drops between a centrally located power supply and the battery terminals. However, for small installations comprising a few stations in close proximity, wherein the DC voltage drops are not excessive, the central controller 20 may also include one or more of the DC power supplies. In one still further embodiment of the invention the central controller may be eliminated altogether, with each local controller communicating directly with the credit card authorization center, or operating autonomously to debit the consumer's balance within the card memory. Another embodiment includes one or more card interface devices in association with the central controller 20, and not the local controller 10.

A still further embodiment provides a data entry device, such as a keypad 30 (FIG. 1*b*), at each local STATION or at the central controller 20 whereby a consumer is enabled to enter a personal or an organizational account code against which a monetary charge is to be made. The data entry device may also be employed to enter other information, such as a type of battery that is installed within the vehicle so that, by example, the voltage level or the battery charging rate may be set by the local or the central controller. A data output device, such as an LCD display 32 (FIG. 1*b*), may also be employed for communicating information to the consumer, such as instructions or an indication of the amount of money to be charged to the consumer.

Figure 6:
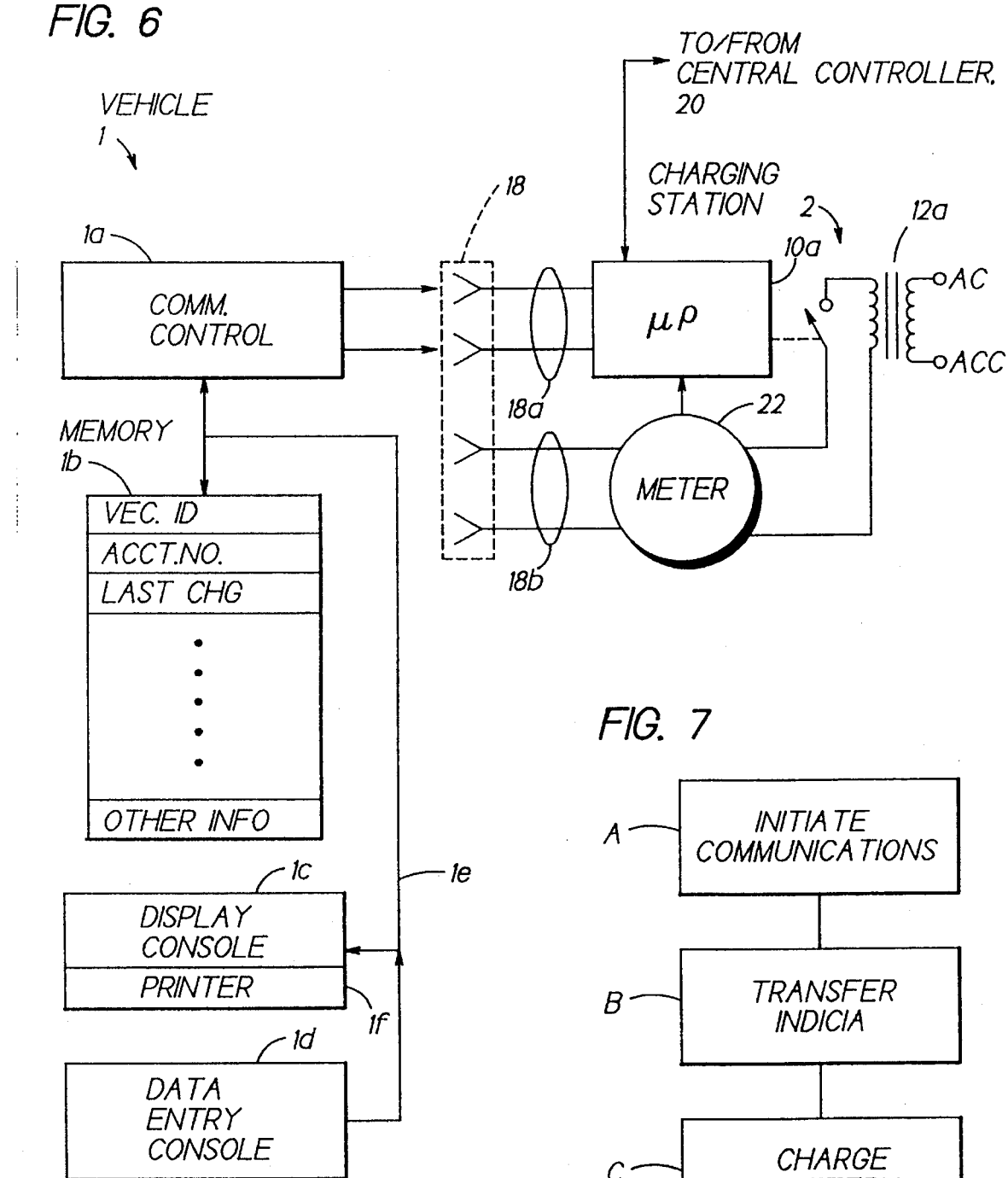
FIG. 6 is a block diagram illustrating a battery charging station and a vehicle, wherein information is transferred between the vehicle and the battery charging station.
Figure 7:
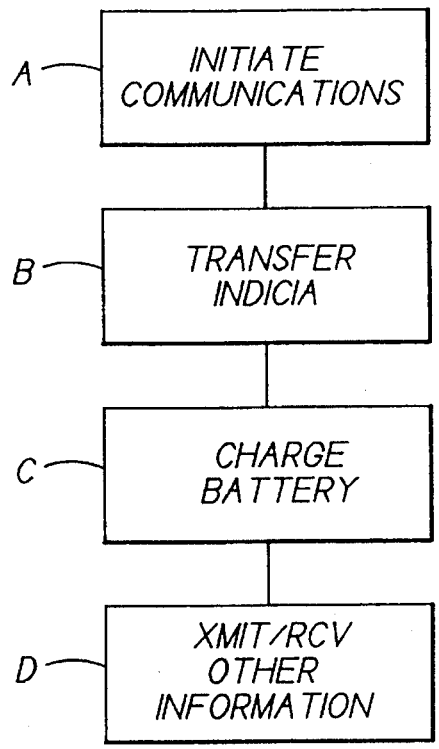
FIG. 7 is a flowchart illustrating the operation of the battery charging station and vehicle of FIG. 6.

In a still further embodiment, and referring to FIGS. 6 and 7, a battery charging station and a vehicle are provided wherein information is transferred between the vehicle and the battery charging station.

In this embodiment the connector 18 includes a data communications portion 18*a* and a power dispensing portion 18*b*. AC power is dispensed from the transformer 12*a*, and a meter 22 provides an indication of the dispensed power to the microprocessor 10*a*. The data communications portion 18*a* of the connector 18 is coupled to the microprocessor 10*a*. The vehicle 1 includes a communication controller 1a that is coupled to the microprocessor 10*a* through the data communications portion 18*a* of the connector 18. The vehicle 1 also includes a memory 1*b* that stores user-specific information. The user specific information includes a vehicle identification (VEC. I.D.) and, for example, an account number (ACCT. NO.). The memory 1*b* may also store other information, such as information relating to a last charging operation (LAST CHG), with which the communications controller 1a is enabled, in conjunction with an odometer reading and the current charging information, to monitor the energy efficiency of the vehicle 1. To this end the vehicle may also include a display console 1c, such as an LCD display or a video monitor, which is used to display the energy usage and efficiency to the user. The vehicle may also include a data entry console 1d. A bus 1e couples together the communications controller 1a, memory 1b, display console 1c and data entry console 1d. The data entry console 1d can be employed by the user to initiate a transfer of information from the vehicle 1 to the charging station 2, such as a transfer of the ACCT. NO. Alternately, this transfer can be accomplished automatically by the communications controller 1a in concert with the microprocessor 10a.

Referring to FIG. 7, at Block A the user connects the vehicle 1 to the charging station 2. Responsive to the connection, communications are initiated by the microprocessor 10a by interrogating the communications controller 1a for the ACCT. NO. information stored in the memory 1b. The VEC. I.D., and also optional other information, may be transferred from the vehicle 1 to the charging station 2 via the data communications portion 18a of the connector 18 (Block B). In response to the received indicia, the microprocessor 10a communicates with the central controller 20 to verify the ACCT. NO. Assuming that the ACCT. NO. is verified, the microprocessor 10a activates the transformer 12a, the battery of the vehicle 1 is charged, and the meter 22 is read to obtain an indication of the dispensed power (Block C). An accounting is then made in cooperation with the previously received indicia.

At the completion of the charging cycle, the communications controller 1a is enabled to determine the energy efficiency of the vehicle, based on information received from the microprocessor 10a and internal odometer readings. In this manner the communications controller 1a is enabled to detect abnormal battery or vehicle conditions. Any pertinent information can be displayed to the user through the use of the display console 1c. The communications controller 1a then updates the LAST CHG information stored within the memory 1b. At Block D, an optional step of transferring other information is executed, it being realized that Block D may be executed prior to the completion of the battery charging operation.

The execution of Block D enables a number of valuable operations to be performed. One operation enables the central controller 20 to transmit unsolicited or solicited advertisements to the vehicle 1 for display on the display console 1c. By example, the names of lodgings, restaurants, and/or recreational areas within a predetermined radius of the charging station 10 can be displayed to the user. In response, the user can employ the data entry console 1d to make further inquiries as to location, rates, etc. Further by example, using predetermined keystrokes the user can reserve a room at a selected lodging, and can initiate a transfer of the stored ACCT. NO., or another account number, to be relayed to the selected lodging via the microprocessor 10a and the central controller 20. A confirmation number may then be relayed from the selected lodging, via the central controller 20, to the vehicle 1 for display on the display console 1c. An optional printer device 1f can also be employed to provide a hard copy of the confirmation number, and/or to provide a copy of addresses, rates, billing information, etc. The optional printer device 1f may also be employed to provide the user with discount coupons, advertising literature, the location of and distance to other charging stations, etc.

Another operation that is enabled by the execution of Block D is the transmission and/or reception of other information in the form of messages. For example, a party wishing to contact an occupant of the vehicle 1 transfers a message to the central controller 20, the message including the VEC. I.D., the ACCT. NO., or some other identifying information. The message and identifying information is stored within the central controller 20. The other identifying information can include, by example, the vehicle's license plate number, the name of the driver, a telephone number, or the name of a passenger. In this regard, the vehicle operator can manually enter other identifying information into the memory 1b with the data entry console 1d. By example, before beginning a journey the operator can enter the names of any passengers into the memory 1b.

In response to receiving the message, the central controller 20 monitors incoming communications from charging stations 20 to identify a transmission from the vehicle to which the stored message is directed. When operating in this mode the communications controller 1a transfers all identification-related information from the memory 1b to the central controller 20, via the microprocessor 10a. When the central controller 20 identifies a transmission from the vehicle having the stored message, the central controller transfers the stored message to the vehicle 1 for display and optional printing. An acknowledgement signal may be automatically or manually generated within the vehicle for transmission back to the central controller 20.

If the central controller 20 determines that a last charging operation was accomplished at a charging station within a predetermined distance from a periphery of an area served by the central controller 20, the central controller may 20 may relay the stored message to another central controller within an adjacent area. In this manner the message can be relayed to one or more additional central controllers for eventual delivery to the vehicle 1. In like manner an acknowledgement signal can be relayed back to the originating central controller.

Initiating a message within the vehicle 1 is accomplished by the operator employing the data entry console 1d to enter a message and an address of the message destination, such as telephone number or the identification of another vehicle. The message and identifying information are temporarily stored in the memory 1b. During a next charging operation the stored message information is relayed from the communications controller 1a, via the microprocessor 10a, to the central controller 20 for delivery. If delivery is accomplished during the charging operation, then an acknowledgment signal may be transferred immediately back to the vehicle 1 for display to the operator. If message delivery is delayed, then the acknowledgment signal is stored within the central controller 20 for delivery to the vehicle 1 during a next charging operation at another charging station.

Figure 8:
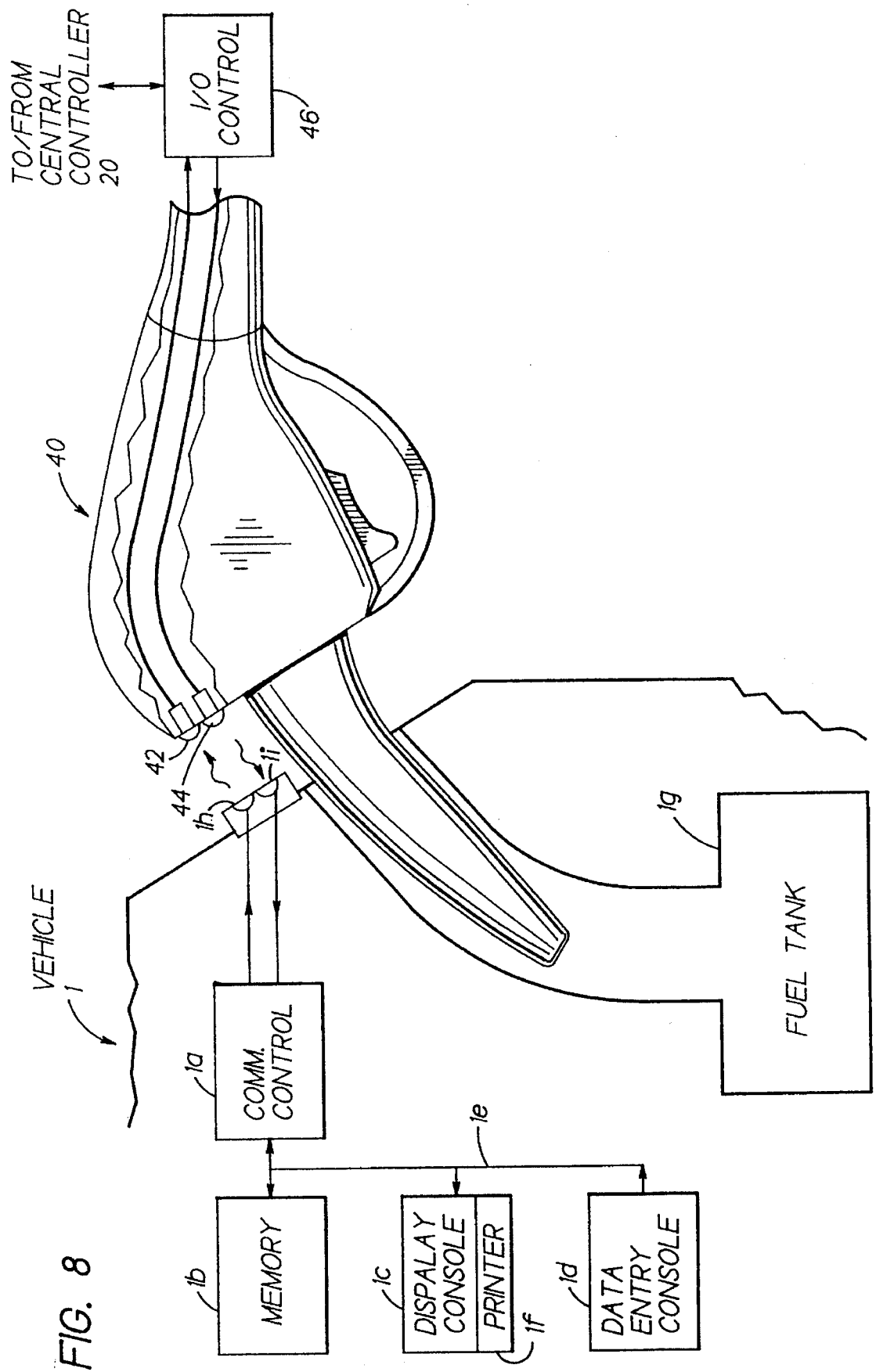
FIG. 8 is a block diagram illustrating a fueling station and a vehicle, wherein information is transferred between the vehicle and the fueling station.

FIG. 8 illustrates the teaching of this invention as applied to a fueling station for a vehicle 1 having an internal combustion engine and a fuel tank 1g. In this embodiment of the invention the direct electrical connection provided by the data communications portion 18a of connector 18 is eliminated, and replaced with an optical, infrared (IR) radiation data link. To this end a fuel nozzle 40 includes an IR receiver 42 and an IR transmitter 44 that provide bidirectional data communications with corresponding IR transmitter 1h and IR receiver 1i. IR transmitter and receiver 1h and 1i are positioned on the vehicle 1, with respect to the normal position of the nozzle 40 during a fueling operation, so as to enable bidirectional bit serial data communications between communications controller 1a and an I/O controller 46 located at, or near to, the fuel pump. I/O controller 46 is in bidirectional communication with the central controller 20, as in the embodiment of FIG. 6.

The vehicle 1 includes the memory 1b, display console 1c, data entry console 1d, bus 1e, and optional printer 1f, and operates as described above with respect to the flow chart of FIG. 7, with modifications being made for dispensing a liquid fuel instead of electrical power. That is, account number information is automatically transferred between the vehicle 1 and the remote controller 20 during a fueling operation. The fueling station also transmits an amount of liquid fuel that is provided to the fuel tank 1g. Other information can also be transferred, such as advertisements, lodging information, confirmations, and messages to or from an occupant of the vehicle.

It can be realized that the interconnection between the vehicle 1 and the charging station 2 may be provided in a number of suitable embodiments, including a low power RF link and an inductive transmitter and receiver. The use of a wireless connection, as opposed to a direct electrical connection, is preferred in the embodiment of FIG. 8 to avoid a possibility of generating a spark during the coupling and uncoupling of the nozzle 40, and also to accommodate the various positions that the nozzle 40 may assume during the fueling operation.

Figure 9:
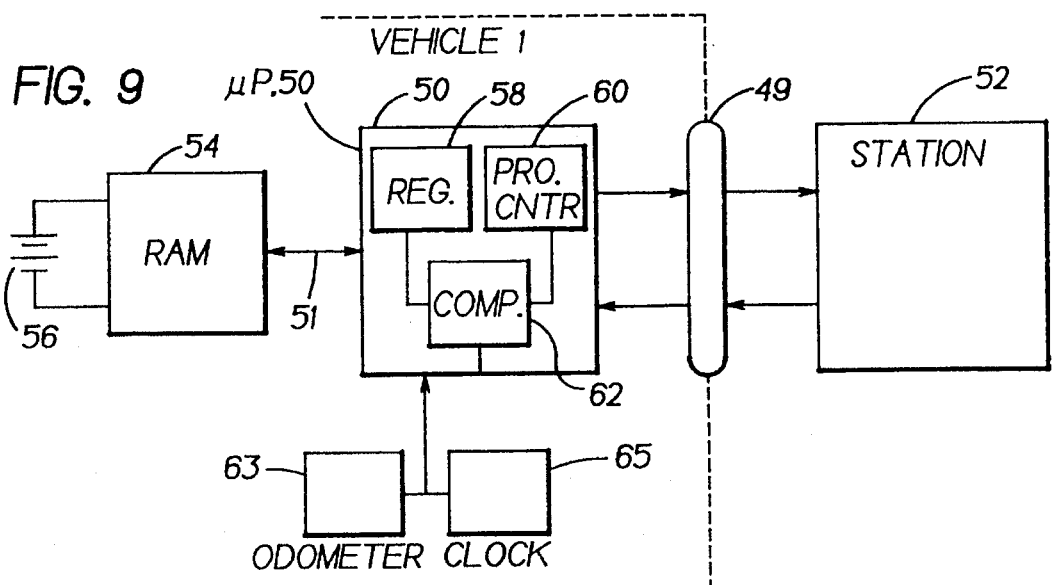
FIG. 9 is a block diagram of an embodiment of the invention wherein information, such as at least one executable instruction, is entered into a memory of the vehicle for use by a vehicle data processor.

FIG. 9 illustrates an embodiment of the invention wherein a unidirectional or bidirectional data communications link 49 is employed for entering variables, constants, a program, and/or revising a program that is used by a programmable controller, such as a microprocessor 50. In this embodiment the microprocessor 50 is responsive to data input from a station 52 to store the inputted data into a read/write Random Access Memory (RAM) 54. Preferably the RAM 54 is a non-volatile device and is equipped with a power source, such as a battery 56. The battery 56 may be the battery of the vehicle 1 or may be a separate battery. Alternately, the RAM 54 may be implemented with any suitable non-volatile type of memory device, such as an EAROM, etc.

In response to a transmission from the station 52 the microprocessor 50 stores data over bidirectional bus 51 within the RAM 54. By example only, the data may be subsequently employed to replace one or more segments of program code that is normally executed by the microprocessor 50. Also by example, the data may be employed to initialize or update a variable that is stored by the RAM 54. The variable can represent a date, such as a date that an emissions compliance test was last performed or is next due to be performed, a date that maintenance was last performed or is next due to be performed, a date that a consumable energy source was last input to the vehicle 1, etc. It can be realized that the data transmission to the vehicle 1 may be as simple as providing a date, or may be more complex as when an executable program is entered for storage within the RAM 54.

In this regard the microprocessor 50 may include or have access to one or more memory replacement registers 58. When entering program code into the RAM 54 a corresponding memory address is also entered. The memory address typically corresponds to a beginning address in the RAM 54 of a program segment (e.g., instruction, subroutine, etc.) that is to be updated or replaced. During program execution a program counter 60 of the microprocessor 50 is compared to the content of the memory replacement register 58. When a match occurs, as sensed by a comparator 62, an interrupt is generated to vector the next program instruction fetch to the address stored in the memory replacement register 58. This address typically points to an address location within the RAM 54, the address location being the initial address of at least one instruction or constant that was entered through the bidirectional data interface 49 from the station 52. Upon completion of the execution of the program code within the RAM 54 a return can be made to another address location within the RAM 54, such as by modifying the content of the program counter 60 to point to the desired location within the RAM 54. As such, it is made possible to alter, enhance, "patch", or otherwise modify a program that is executed by the microprocessor 50 within the vehicle 1.

The station 52 need not be a station that dispenses a consumable energy source to the vehicle 1, but may instead be a station installed at a location that provides a service to the vehicle such as, by example, an emissions testing facility, a maintenance center, a tire replacement center, etc. By example only, if a location within the RAM 54 corresponds to or is associated with a tire replacement variable, then when purchasing a new tire the tire dealer enters into the RAM 54, through the station 52, a corresponding code and other information such as the expected tire lifetime. In response the microprocessor 50 obtains a current vehicle odometer reading either from an odometer 63 or from data input from the station 52, and format a data structure for storage within the RAM 54. The purpose of this data structure is to inform the occupant of the vehicle 1 of when it is time to purchase new tires. Other information can also be entered, such as the date (if not maintained automatically in a date and time clock device 65) and the name of the dealer installing the tires. As a result, and assuming that the new tire is rated for 40,000 miles, at 35,000 miles (by example,) plus the current odometer reading, a message is presented to the operator of the vehicle 1. The message may be in the form of a visual and/or synthesized speech presentation, and indicates, by example, the date when the tires were purchased, the vehicle mileage when the tires were purchased, the mileage remaining (as a function of the current odometer reading) before the rated tire life is exceeded, and also (optionally) the name and address of the dealer where the tires were purchased. As the remaining warranted tire mileage grows less an audible indicator may also be added to the visual and/or synthesized speech message that is presented to the occupant of the vehicle.

By this one example it is made apparent that a wide variety of data types can be stored within the RAM 54. Other examples include, but are not limited to, a date that scheduled maintenance is next due, a date that an oil change is next due, a date or odometer reading when a consumable energy source was last input to the vehicle, etc.

Figure 10:
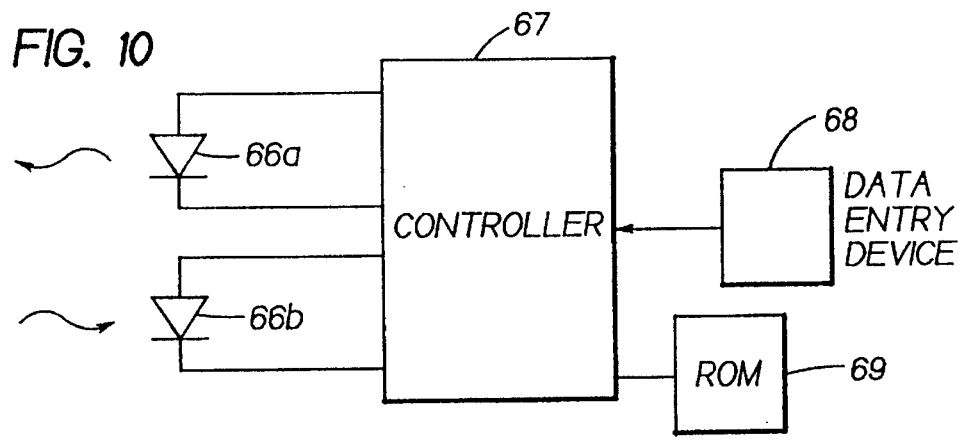
FIG. 10 is a block diagram of an embodiment of a station suitable for entering data into the vehicle.

Due to the relatively simple nature of the vehicle/station interface the station 52 programming apparatus need not be overly complex or expensive. By example, and referring to FIG. 10, the programming apparatus has an input/output section, by example IR LED 66a and IR detector 66b, a controller 67, and some form of data entry device 68. The data entry device 68 may be switches set by an operator, or any suitable means for entering a date, a constant, such as a mileage/kilometer value, etc. A promotional message, such as a dealer's name, address, etc, can be provided on a magnetic stripe, ROM, or some other suitable mechanism 69 that is readable by the controller 67.

Of course, it may be desirable to provide the station as a personal computer having an optical, electrical, RF, magnetic, etc., interface suitable for bidirectionally transmitting the information into the vehicle for storage within the RAM 54. In this case the date can be obtained internal to the personal computer and the data entry device 68 may be a keyboard of the personal computer.

If the vehicle 1 is equipped with the hard copy generating means 1f (FIGS. 7 and 8), then the message information can also be delivered within the vehicle in printed form. By example, when the odometer 63 indicates that a tire replacement, engine maintenance, oil change, etc., is due, a coupon can be printed out. The coupon can indicate the name of the dealer last visited, the (approximate) date that a next service call is expected, and, optionally, a discount useable for the next service call. The date that a next service call is expected can be derived by the microprocessor 50 by determining an approximate number of miles/kilometers that are driven daily (as obtained from the odometer 63 and the internally maintained time/date clock 65), and by then using the daily mileage to divide a difference between the current odometer reading and the stored miles/kilometer value.

Figure 11:
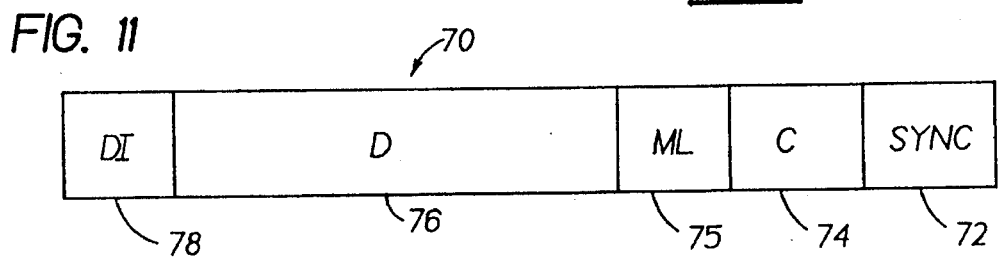
FIG. 11 illustrates an exemplary data format for transferring information into the vehicle.

FIG. 11 illustrates one suitable embodiment of a message format to be transferred between the vehicle 1 and the station 52. By example, one message 70 may comprise up to $FFFF_{16}$ bytes (one byte=eight bits). The exemplary message 70 includes an optional synchronizing (SYNC) portion 72 (e.g., 2 bytes), a command (C) portion 74 (e.g. 2 bytes), a message length (ML) portion (e.g., 2 bytes), a data (D) portion 76 (up to FFF7 bytes), and a data integrity (DI) portion (78), such as a one byte check sum or a CRC. As a result, ML=(SYNC+CMD+ML+DATA+DI). Alternately, a fixed length transmission can be employed, thereby eliminating the ML portion. The message can be transmitted in any suitable fashion, such as a return to zero (RTZ) format, a non-return to zero (NRTZ) format, an amplitude modulation (AM) format, a Frequency Shift keying (FSK) format, or a Phase Shift Keying (PSK) format.

In response to receiving the message the receiver (i.e., vehicle 1 or station 52) may transmit an acknowledgement. The acknowledgement can indicate, by example, that the receiver (a) received the message with no errors; (b) received the message with at least one error (e.g., request to re-transmit); or (c) received the message but is unable to execute the associated command.

It should be realized that the message format, the transmission protocol, etc. that have been described previously are only exemplary of the many suitable types of message formats, message lengths, and transmission protocols that are suitable for use in accordance with the teaching of this invention. As an example, it may be desirable to provide a message encryption capability. The encryption capability may be especially useful to prevent the inadvertent or intentional inputting or modification of constants, variables, and/or programs within the RAM 54. The literature is replete with suitable types of encryption/decryption algorithms, hardware, and methods.

Although the invention has been described in the context of a number of exemplary embodiments, it should be appreciated that the teaching of this invention is not so limited. That is, the teaching of this invention is not limited to any particular message length, message format, data representation, modulation type, or message transducer (i.e. LEDs). For example, laser diodes and receivers, induction energy generators and detectors, and acoustic energy transducers and receivers can be employed for bidirectionally transmitting messages and optional responses between the vehicle 1 and the station 52.

Figure 12:
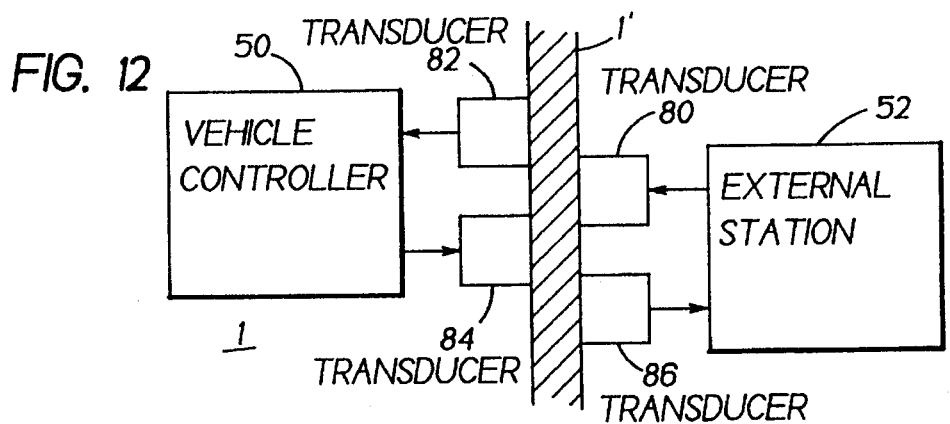
FIG. 12 illustrates an embodiment of an acoustic energy transmitter and receiver for bidirectionally transferring information between a vehicle and a programming station.

By example, and referring to FIG. 12, an acoustic energy transducer 80 is applied to an external surface 1' of the vehicle 1 and a corresponding acoustic energy detector 82 is positioned within the vehicle 1 for detecting the inputted acoustic energy, the detected acoustic energy conveying information from the external station 52 to the controller 50 within the vehicle 1. A corresponding acoustic energy transducer 84 and acoustic energy detector 86 may be positioned for conveying information from the controller 50 to the external station 52. Different acoustic frequencies can be used to enable bidirectional, full duplex communication between the controller 50 and the station 52.

As such, the above described embodiments of the invention are intended to be illustrative of the teaching of this invention, and are not intended in any way to be construed in a limiting sense upon the practice and use of this invention. That is, the breadth of the teaching of this invention is intended to be given a scope that is commensurate with the scope of the claims that follow.

What is claimed is:

1. A method for communicating with an occupant of a vehicle, comprising the steps of:

coupling the vehicle to a station;

transferring information from the station into the vehicle, the transferred information including a date portion;

receiving the transferred information and storing the transferred information within the vehicle;

automatically comparing, in the vehicle, a current date to the stored date portion; and when the current date is equal to the stored date portion, presenting a message within the vehicle in human perceptible form.

2. A method as set forth in claim 1 wherein the steps of transferring and receiving are accomplished through an electrical connection.

3. A method as set forth in claim 1 wherein the steps of transferring and receiving are accomplished through a wireless connection.

4. A method as set forth in claim 1 and, responsive to receiving the transferred information, transmitting an acknowledgment signal from the vehicle to the station.

5. A method as set forth in claim 1 and further including a step of generating, within the vehicle, a hard copy of the message.

6. A method as set forth in claim 1 and including the initial steps of:

entering information with a station data entry means; and storing the entered information within the station.

7. A method as set forth in claim 1 wherein the message includes information for identifying at least a location of the station.

8. A method as set forth in claim 1 wherein the station includes means for dispensing a consumable energy source to the vehicle before, during, or after transferring the information to the vehicle.

9. A method as set forth in claim 1 wherein the station is located at a site that provides a service for the vehicle, and wherein the transferred information includes a portion that indicates when a next service is due for the vehicle.

10. A method as set forth in claim 9 wherein the portion includes a date.

11. A method as set forth in claim 9 wherein the portion includes a distance that the vehicle will travel before a next service is due for the vehicle.

12. A method for communicating with an occupant of a vehicle, comprising the steps of:

coupling the vehicle to a station;

transferring information from the station into the vehicle; and receiving the transferred information and storing the transferred information within the vehicle;

wherein the station is located at a site that provides a service for the vehicle, wherein the transferred information includes a portion that indicates when a next service is due for the vehicle; wherein the portion of the transferred information includes a date, and further comprising the steps of:

automatically comparing, in the vehicle, a current date to the stored date portion; and when the current date is equal to the stored date portion, presenting a message within the vehicle in human perceptible form.

13. A method as set forth in claim 12 wherein the steps of transferring and receiving are accomplished through an electrical connection.

14. A method as set forth in claim 12 wherein the steps of transferring and receiving are accomplished through a wireless connection.

15. A method as set forth in claim 12 wherein the steps of transferring and receiving are accomplished through an acoustic connection.

16. A method as set forth in claim 12 and, responsive to receiving the transferred information, transmitting an acknowledgment signal from the vehicle to the station.

17. A method as set fourth in claim 12 and further including a step of generating, within the vehicle, a hard copy of the message.

18. A method as set forth in claim 12 and including the initial steps of:

entering service-related information with a station data entry means; and storing the entered information within the station.

19. A method as set forth in claim 12 wherein the transferred information includes information for identifying at least a location of the station.

20. A method as set forth in claim 12 wherein the portion includes a distance that the vehicle will travel before a next service is due for the vehicle.

21. A method as set forth in claim 20, and further convulsing the steps of:

automatically comparing, in the vehicle, a current distance that the vehicle has travelled to the stored distance portion; and when the current distance travelled is equal to the stored distance portion, presenting a message within the vehicle in human perceptible form.

22. A system for communicating with an occupant of a vehicle, comprising:

means for coupling the vehicle to a station;

means for transferring information from the station into the vehicle; and means, within the vehicle, for receiving the transferred information and storing the transferred information;

wherein the station is located at a site that provides a service for the vehicle, wherein the transferred information includes a portion that indicates when a next service is due for the vehicle; wherein the portion of the transferred information includes a date, and further comprising:

means for automatically comparing, within the vehicle, a current date to the stored date portion; and means, responsive to a condition wherein said comparing means indicates that the current date is equal to the stored date portion, for presenting a message within the vehicle in human perceptible form.

23. A system as set forth in claim 22, and further comprising means, responsive to receiving the transferred information, for transmitting an acknowledgment signal from the vehicle to the station.

24. A system as set forth in claim 22, wherein said presenting means is comprised of means for generating, within the vehicle, a hard copy of the message.

25. A system as set forth in claim 22, wherein the message includes information for identifying at least a location of the station.

26. A system for communicating with an occupant of a vehicle, comprising:

means for coupling the vehicle to a station;

means for transferring information from the station into the vehicle; and means, within the vehicle, for receiving the transferred information and storing the transferred information;

wherein the station is located at a site that provides a service for the vehicle, wherein the transferred information includes a portion that indicates when a next service is due for the vehicle; wherein the portion of the transferred information includes a date, and further comprising:

first means for automatically comparing, within the vehicle, a current date to the stored date portion; and 18 means, responsive to a condition wherein said first comparing means indicates that the current date is equal to the stored date portion, for presenting a message within the vehicle in human perceptible form; and wherein the portion further includes a predetermined distance that the vehicle will travel before a next service is due for the vehicle; and further comprising:

second means for automatically comparing, within the vehicle, a current distance that the vehicle has travelled to the stored distance portion; and wherein said presenting means is further responsive to a condition wherein said second comparing means indicates that the current distance travelled is equal to the stored distance portion, for presenting a message within the vehicle in human perceptible form.

* * * * *